United States Patent
Yang

[19]

[11] Patent Number: 6,129,344
[45] Date of Patent: Oct. 10, 2000

[54] COMBINATION OF A CHOPPING BOARD AND A BASKET

[76] Inventor: Cheng-Wei Yang, No. 242, Sec. 7, Ershi Rd., Erlin Jen, Taiwan

[21] Appl. No.: 09/449,959

[22] Filed: Nov. 26, 1999

[51] Int. Cl.[7] .................................................. B23Q 3/00
[52] U.S. Cl. ........................................ 269/15; 269/289 R
[58] Field of Search ................................. 269/15, 289 R, 269/901, 900, 302.1

[56] References Cited

U.S. PATENT DOCUMENTS

| | | | |
|---|---|---|---|
| D. 361,272 | 8/1995 | Craft et al. | D7/698 |
| 4,653,737 | 3/1987 | Haskins et al. | 269/15 |
| 5,366,208 | 11/1994 | Benjamin | 269/289 R |
| 5,856,105 | 2/1999 | Pepelanov | 269/15 |
| 5,996,983 | 12/1999 | Laurenzi | 269/15 |

*Primary Examiner*—David A. Scherbel
*Assistant Examiner*—Lee Wilson
*Attorney, Agent, or Firm*—Rosenberg, Klein & Lee

[57] ABSTRACT

A chopping board includes a U-shaped groove defined in a bottom thereof and a basket has an open top so that the peripheral rail defining the open top of the basket is engaged with the groove if the chopping board. The area of the chopping board is smaller than the area of the open top of the basket so that the food treated on the chopping board is pushed directly into the basket from the open top not covered by the chopping board. A frame is slidably engaged with two sides of the basket so as to conveniently position the basket on the sink top of the counter.

2 Claims, 3 Drawing Sheets

COMBINATION OF A CHOPPING BOARD AND A BASKET

FIELD OF THE INVENTION

The present invention relates to a combination of a chopping board and a basket, wherein the chopping board has grooves in a bottom thereof so as to engage with a top of the basket. The area of the chopping board is smaller than the top of the basket so that the food chopped on the chopping board can be pushed into the basket directly.

BACKGROUND OF THE INVENTION

A conventional chopping board is used independently on counter and food is cut or chopped on the chopping board. After the food such as vegetable or a piece of meat is cut or chopped on the chopping board, the chef removes the cut or chopped food from the chopping board to a basket. In other words, the chef will reciprocatingly collect the treated food two or three times to completely put the food in the basket. During the removing of the food from the chopping board to the basket, small food could drop from the hands of the chef and water will drop on the counter or the floor.

The present invention intends to provide a combination of a chopping board and a basket, the area of the chopping board is smaller than the open top of the basket so that the chopped food can be directly removed from the chopping board into the basket.

SUMMARY OF THE INVENTION

In accordance with one aspect of the present invention, there is provided a combination of a chopping board and a basket. The chopping board has a U-shaped groove defined in a bottom thereof and the basket having an open top which is defined by a peripheral rail which is engaged with the groove in the chopping board. Two support members are located on two sides of the basket and a rectangular frame is slidably engaged with the support members.

The object of the present invention is to provide a chopping board that is engaged with a basket so that the treated food on the chopping board can be directly pushed into the basket.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Figure 1:
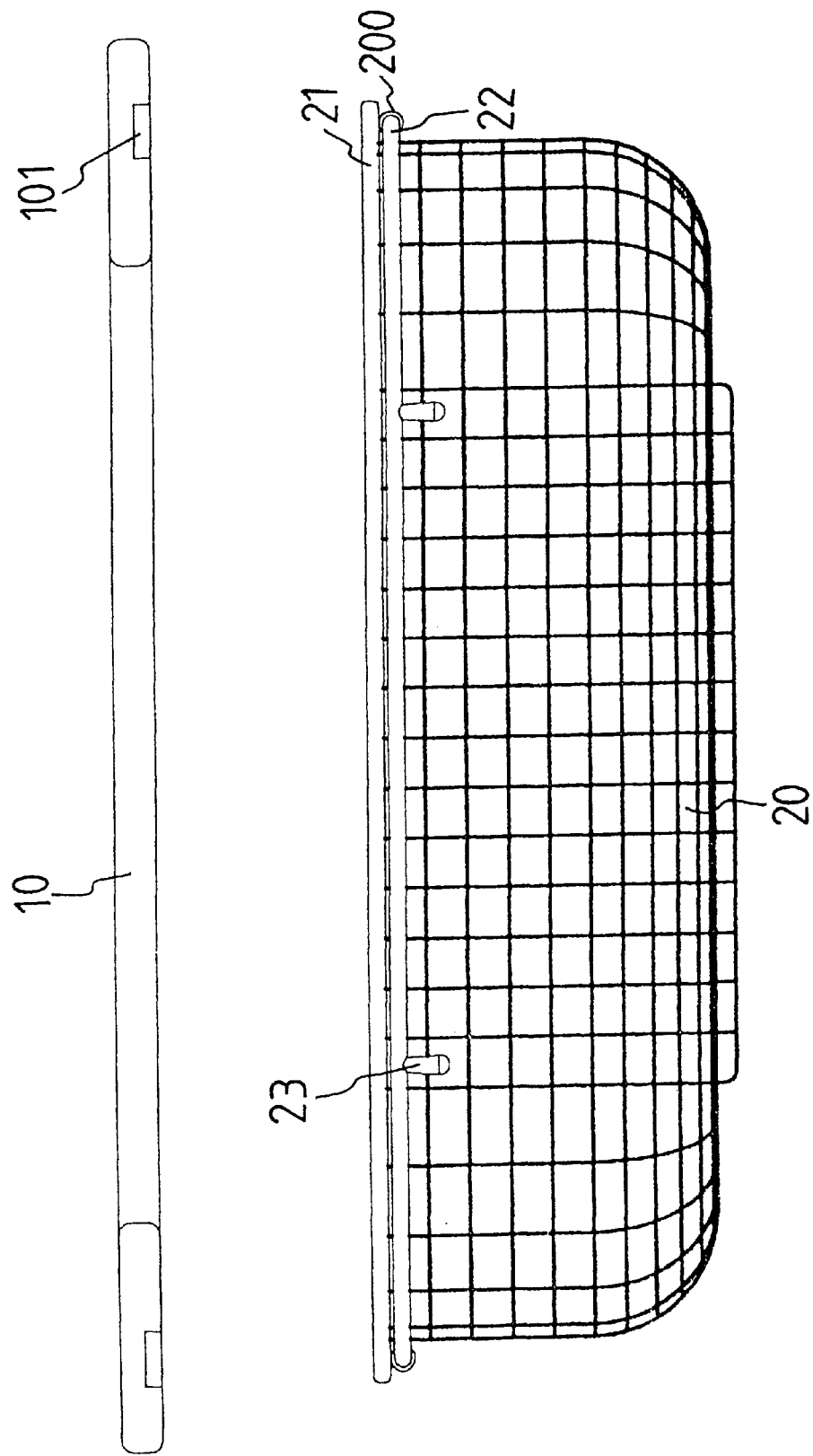
FIG. 1 is a chopping board and a basket of the present invention.
Figure 2:
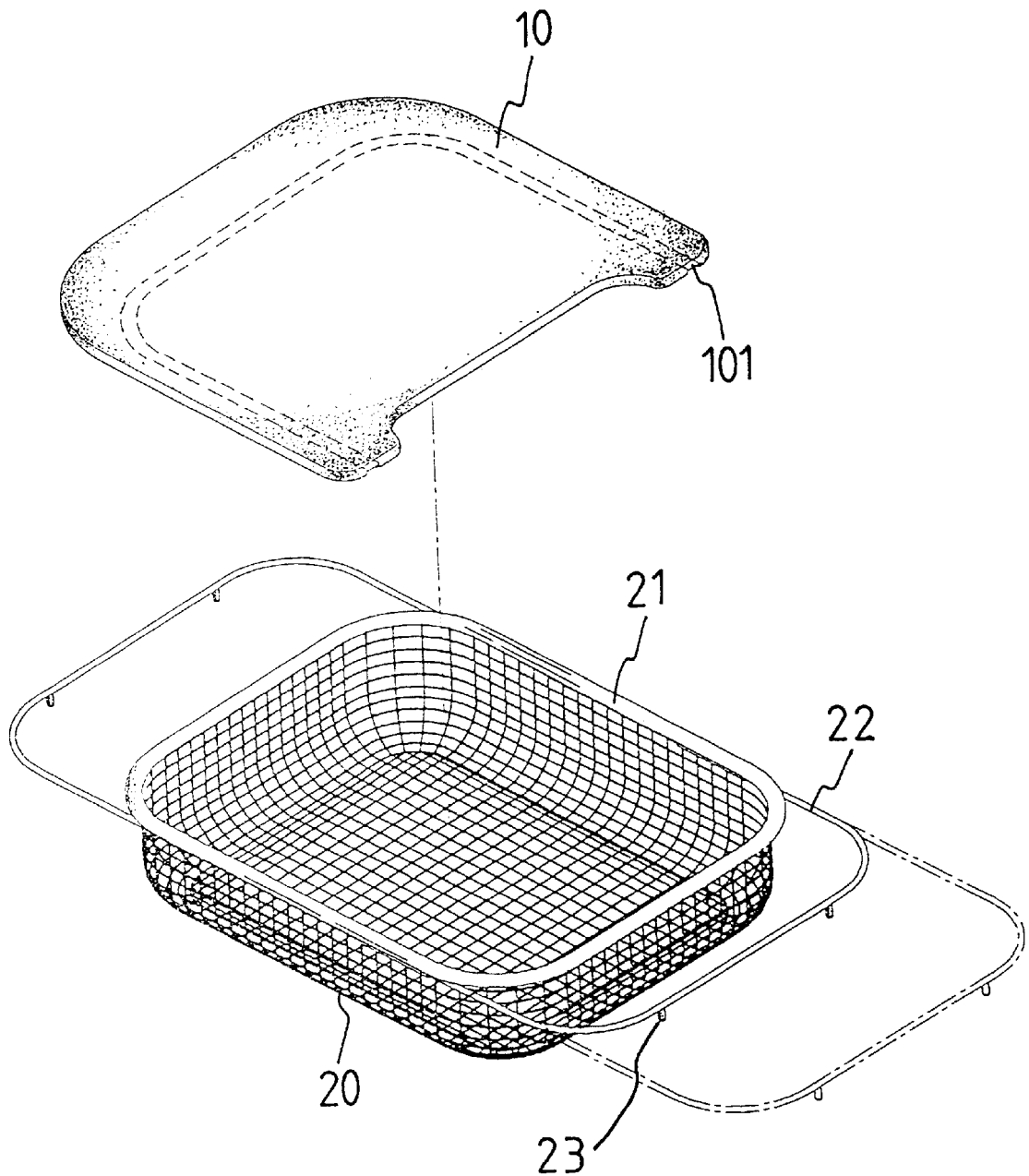
FIG. 2 is an exploded view of the chopping board and the basket in accordance with the present invention.
Figure 3:
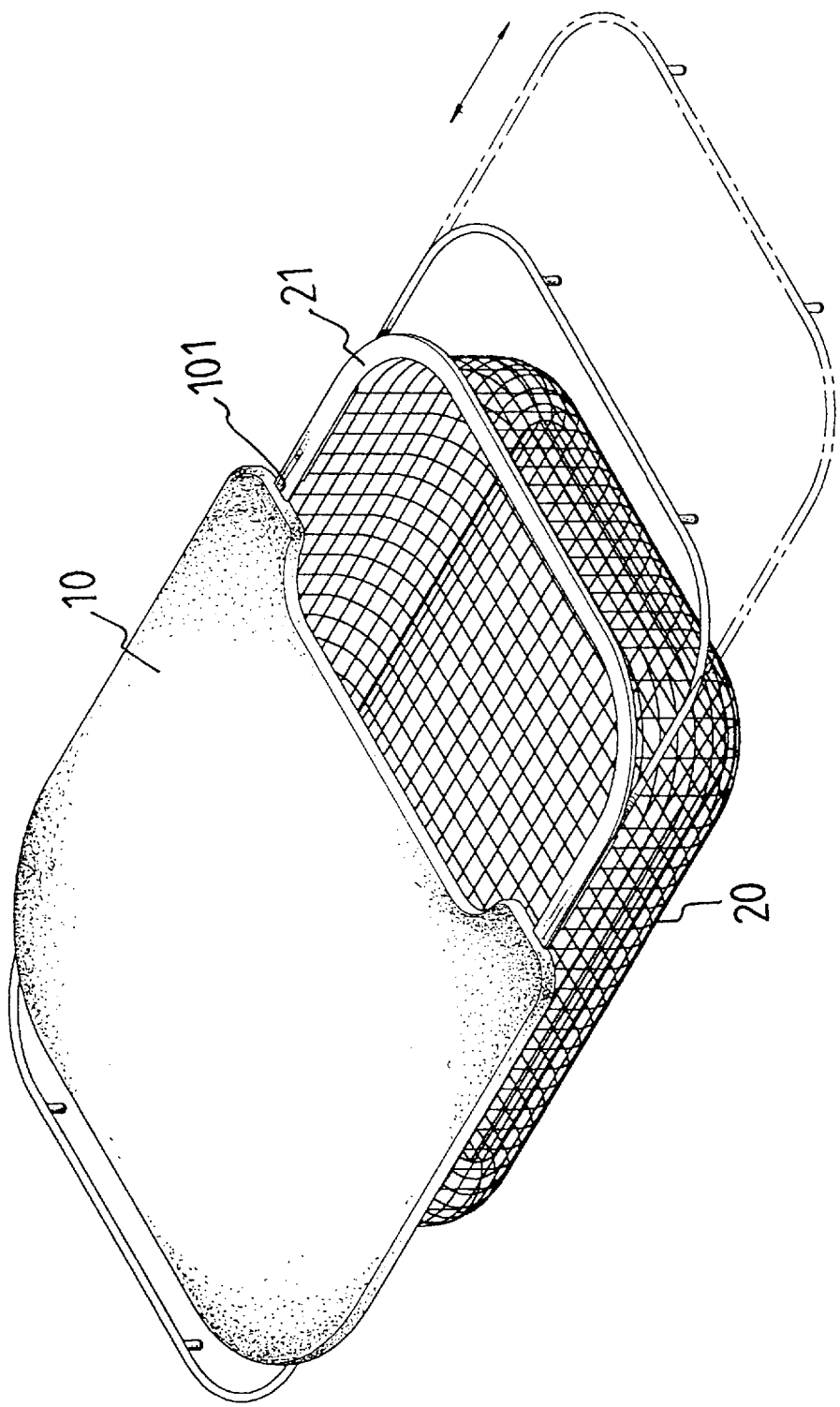
FIG. 3 is a perspective view to show the combination of the chopping board and the basket of the present invention.

Referring to FIGS. 1 to 3, the chopping board 10 of the present invention has a U-shaped groove 101 defined in a bottom thereof. The basket 20 in accordance with the present invention comprises an open top which is defined by a peripheral rail 21 and two support members 200 are located on two sides of the basket 20. A rectangular frame 22 is slidably engaged with the support members 200 so that the basket 20 is retained within the rectangular frame 22.

The peripheral rail 21 of the basket 20 is engaged with the groove 101 of the chopping board 10. It is to be noted that an area of the chopping board 10 is smaller than the open top of the basket 20 so that there is an opening in the top of the basket 20 not covered by the chopping board 10. The rectangular frame 22 can be slid relative to the support members 200 so that the basket 20 can be put in the sink top and the rectangular frame 22 is put on the top of the counter. A plurality of anti-slip legs 23 extend from the rectangular frame 22 so as to be secured on the top of the counter. The combination of the present invention provides a proper structure to combine the basket 20 and the chopping board 10.

While we have shown and described various embodiments in accordance with the present invention, it should be clear to those skilled in the art that further embodiments may be made without departing from the scope and spirit of the present invention.

What is claimed is:

1. A combination of a chopping board and a basket, said chopping board having a U-shaped groove defined in a bottom thereof, and said basket having an open top which is defined by a peripheral rail and two support members located on two sides of said basket, a rectangular frame slidably engaged with said support members, said peripheral rail engaged with said groove of said chopping board.

2. The combination as claimed in claim 1 wherein an area of said chopping board is smaller than said open top of said basket.

* * * * *